Figure 1:
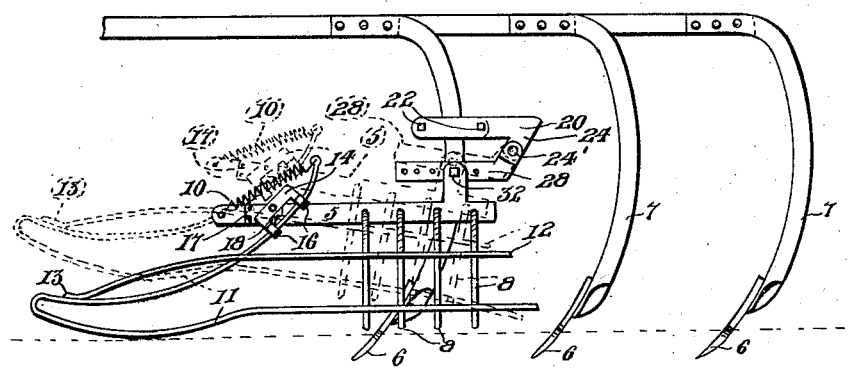

O. B. KOSMALSKI.
CULTIVATOR SHIELD.
APPLICATION FILED FEB. 28, 1921.

1,414,191. Patented Apr. 25, 1922.
2 SHEETS—SHEET 1.

Inventor
O. B. Kosmalski
By F. K. Bryant
Attorney

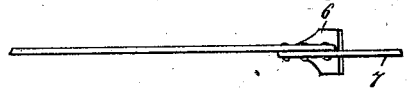
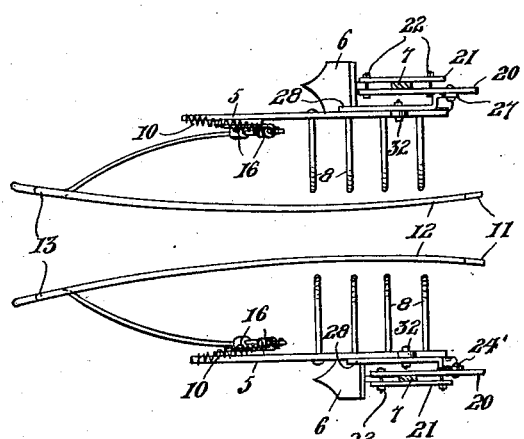
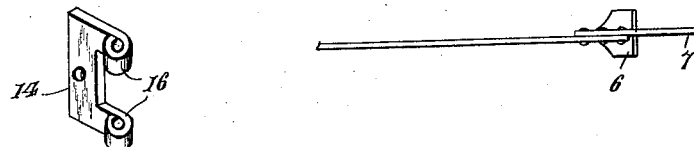
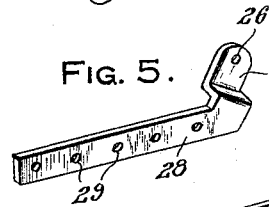
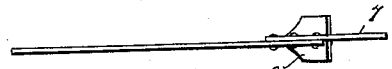
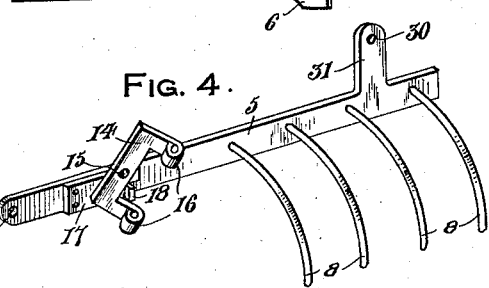

UNITED STATES PATENT OFFICE.

OLAF B. KOSMALSKI, OF TAUNTON, MINNESOTA.

CULTIVATOR SHIELD.

1,414,191.

Specification of Letters Patent.   Patented Apr. 25, 1922.

Application filed February 28, 1921. Serial No. 448,287.

*To all whom it may concern:*

Be it known that I, OLAF B. KOSMALSKI, a citizen of the United States of America, residing at Taunton, in the county of Lyon and State of Minnesota, have invented certain new and useful Improvements in Cultivator Shields, of which the following is a specification.

This invention relates to certain new and useful improvements in cultivator shields of that type which are intended to be attached to cultivators of the straddle row type for rendering the cultivating operation more efficient.

The primary object of the present invention is to provide an improved shield of this kind so constructed as to effectively cause lumps of soil to be thrown between the planted rows while at the same time allowing substantially all of the fine dirt to be moved against the plant.

A further object of the invention is to provide a shield of this kind which will effectively raise fallen plants for permitting the dirt to be thrown around the roots thereof so that the plants will be braced in upright position and whereby covering of the plants with earth is prevented.

A still further object of the invention is the provision of an adjustable mounting means for a cultivator shield, by means of which the shield may be regulated for being most effective in accordance with the height of the plants being cultivated and regardless of the lumpy or finer nature of the soil.

Still another object of the invention is to provide a cultivator shield including a guard member pivotally mounted so as to be allowed to yield upwardly so as to avoid damage thereto when passing over lumpy places or other obstructions, yieldable means being provided for normally maintaining the forward end of the guard lowered and means being provided to limit the downward tilting of said guard.

With the above general objects in view and others that will become apparent as the nature of the invention is better understood, the same consists in the novel form, combination and arrangement of parts hereinafter more fully described and shown in the accompanying drawings, in which like reference characters designate corresponding parts throughout the several views.

Figure 2:
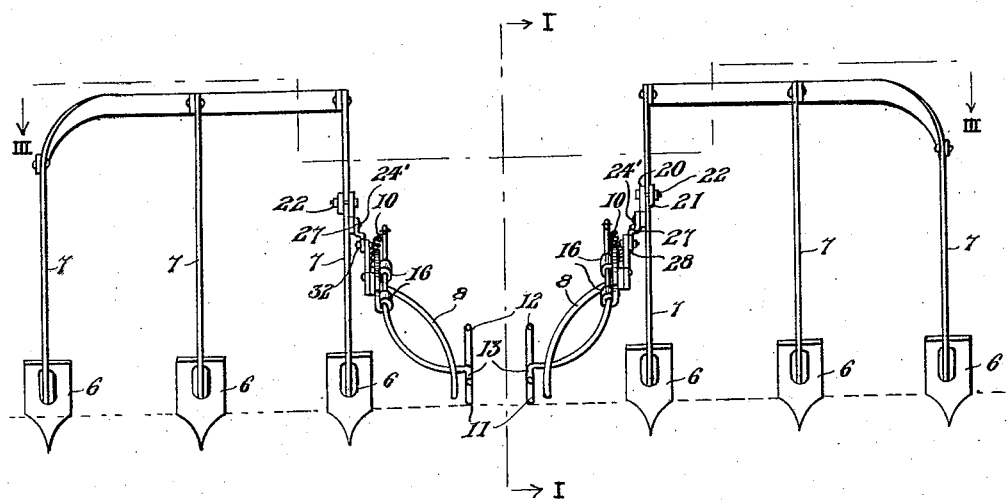

In the drawings,

Figure 1 is a view along line I—I of Figure 2 looking in the direction of the arrows and showing a shield constructed in accordance with the present invention operatively associated with a cultivator.

Figure 2 is a rear elevational view of a cultivator equipped with a pair of shields constructed in accordance with the present invention, parts of the cultivator being omitted, Figure 3 is a view partly in section and partly in top plan taken along line III—III of Figure 2, Figure 4 is an enlarged perspective view of the guard and finger carrying bar of the shield with its attached pivoted guard carrying member, Figure 5 is a similar view of a member of the mounting bracket to which the guard carrying bar is adjustably fastened.

Figure 6 is a similar view of one of the attaching clamp members to which the bracket member of Figure 5 is pivotally fastened, Figure 7 is a similar view of the other member of the attaching clamp, Figure 8 is a similar view of the pivoted guard carrying member, and Figure 9 is a similar view of the stop for the pivoted member of Figure 8.

Referring more in detail to the several views, the present invention contemplates the provision of a shield including a bar 5 adapted to assume a substantially horizontal position beside the shovels 6 of the cultivator bars 7 when in use and having a plurality of spaced depending fingers 8 attached thereto. The fingers 8 extend laterally from the bar 5 and are of inwardly curved form as well as being arranged sufficiently close together as to effectively act as a screen for preventing lumps of dirt from being thrown onto the plants between a pair of shields. In other words, these fingers insure throwing of the lumps of soil between the planted rows.

The forward end portion of the bar 5 is provided with a perforation 9 for reception of one end of a yieldable member 10 which is preferably in the form of a helical spring, and which has its other end attached to an eye on the adjacent end of a guard member 11. The guard 11 is preferably in the form of a stout and slightly resilient wire which is curved downwardly and forwardly and then bent upon itself to extend rearwardly alongside of and beyond the fingers 8 as shown in Figure 1. This rearwardly extending portion of the guard is so arranged as to effectively ride under the fallen plants as well as the drooping leaves of the plants for raising them upon continued outward movement of the cultivator, and another member 12 having a similar function is welded or otherwise secured as at 13 to the forward portion of the guard 11 and extends rearwardly above and parallel with the said rearwardly extending portion of the guard 11. Obviously, when the plants are thus raised, they will be held raised while the shovels of the cultivator throw the fine dirt between the fingers and the parallel portions of members 11 and 12 and against the plants and while said fingers prevent the large lumps from being so thrown or cause said lumps to fall between the planted rows.

A pivoted member or bracket 14 is mounted for longitudinal tilting movement on the bar 5 as at 15, and this bracket is provided with beads 16 in which the adjacent portions of the guard 11 are secured as shown in Figures 1 and 2, and a stop member 17 is fastened to the bar 5 between it and the bracket 14 by riveting or the like so that the lug 18 of said stop is arranged to limit the tilting movement of the bracket 14 in one direction so as to insure against the forward end of the guard 11 being tilted downwardly beyond a predetermined point under the influence of the spring 10. On the other hand, this lug 18 is so arranged as to permit upward tilting of the bracket 14 and similar tilting movement of the guard 11 against the yieldable action of the spring 10 when the upturned toe portion of said guard 11 as to ride over obstructions such as stones or the like.

Means is provided for adjustably mounting the shield upon the inner cultivator bar of the cultivator as shown in Figure 2, wherein two shields are illustrated in spaced relation with the fingers 8 extending inwardly and downwardly toward each other at opposite sides of the planted row. This mounting means includes an attaching clamp composed of the member 20 of Figure 6 and the member 21 of Figure 7 adapted to be bolted against the opposite side faces of the cultivator bar 7 and to each other by bolts 22 passing through the perforations 23 of said members 20 and 21 behind and in front of the bars 7. The clamp member 20 is provided with a forwardly and downwardly inclined end portion 24 having an aperture at 25 in the lower end thereof adapted to register with the aperture 26 of the upwardly extending portion 27 provided on the rear end of a bracket member 28, and a bolt 24' is passed through said apertures 25 and 26 for fastening the members 20 and 28 together and for securing the bracket 28 in various tilted positions as illustrated by dotted and full lines in Figure 1 and for a purpose which will presently become apparent.

The bracket member 28 is in the form of a strip of metal extending forwardly in a substantially horizontal position and having a plurality of spaced perforations 29 adapted to be selectively alined with the aperture 30 of the upwardly extending lug 31 provided on the rear end portion of the guard carrying bar 5. When the aperture 30 has been alined with the desired one of the apertures 29 so that the shield is properly positioned forwardly or rearwardly relative to the adjacent cultivator shovel 6, it is fastened in such position by a bolt 32 passing through the alined perforations 29 and 30. If the plants being cultivated are sufficiently tall, the cultivator shield may be found to operate to better advantage if the shield is tilted upwardly at its forward end as shown by dotted lines in Figure 1, and this may be done by swinging the shield about the bolt 24' as a pivot. If a further adjustment is required, the entire structure may be adjusted upwardly upon the cultivator bar 7 by loosening the bolts 22 of the attaching clamp. These tilting and longitudinal adjustments together with the longitudinal tilting of the guard relative to the fingers insure effective operation of the shield under the many and various conditions met in cultivating.

From the foregoing description, it is believed that the construction and operation of the present invention will be readily understood by those skilled in the art.

Minor changes may be made in the details of the construction without departing from the spirit and scope of the invention.

What is claimed as new is:

1. A cultivator shield of the class described comprising a plant lifting guard, a carrying member for said guard, depending fingers carried by the guard carrying member arranged at the rear portion of the guard and positioned in spaced relation for preventing lumps of dirt from being thrown on the plants while permitting the finer dirt to be moved up against the plants, a mounting bracket adapted to be clamped to the bar of a cultivator and including a substantially horizontal strip portion with spaced apertures, an upstanding lug upon said guard carrying member, and means to bolt said lug to the mounting bracket in forwardly or rearwardly adjusted positions through the provision of the perforations in said mounting bracket.

2. A cultivator shield of the class described comprising a plant lifter guard, a carrying member for said guard, an inverted U-shaped bracket pivoted to said carrying member and having beads upon its ends, said guard including a wire member having its uppermost end journaled within the beads of the said pivoted bracket, and spring connecting means between the extreme end of said wire member and the carrying member for said guard.

3. A cultivator shield of the class described comprising a plant lifting guard, a carrying member for said guard, an inverted U-shaped bracket pivoted to said carrying member and having beads upon its ends, said guard including a wire member having its uppermost end journaled within the beads of the said pivoted bracket, spring connecting means between the extreme end of said wire member and the carrying member for said guard, and a stop bar upon the carrying member for limiting the pivotal movement of said U-shaped bracket and plant lifting guard.

In testimony whereof I affix my signature.

OLAF B. KOSMALSKI.